United States Patent [19]
Slade

[11] Patent Number: 4,863,384
[45] Date of Patent: Sep. 5, 1989

[54] PERSONALIZED FEEDBACK SYSTEM UTILIZING PRE-RECORDED MEDIA AND METHOD OF MAKING SAME

[75] Inventor: Michael G. Slade, San Francisco, Calif.

[73] Assignee: Keilty, Goldsmith & Boone, La Jolla, Calif.

[21] Appl. No.: 850,239

[22] Filed: Apr. 10, 1986

[51] Int. Cl.⁴ .............................................. G09B 7/04
[52] U.S. Cl. .................................... 434/107; 434/219; 434/236; 434/307; 434/308
[58] Field of Search ................ 434/107, 219, 236–238, 434/307, 308, 323; 273/DIG. 28, 1 E

[56] References Cited

U.S. PATENT DOCUMENTS 3,654,708 4/1972 Brudner .............................. 434/307

Primary Examiner—Leo P. Picard
Attorney, Agent, or Firm—Bernard L. Kleinke

[57] ABSTRACT

A personalized feedback system is disclosed that employs survey questionaires for enabling procurement of personalized data indicative of the needs of a user. Compilation components are included for providing computer-readable personal data signals indicative of a compilation of data procured with the survey questionnaires for an individual user. Feedback presentation memory components store a group of pre-recorded feedback display signals that are indicative of a group of vignettes illustrative of various results of the personal data, and recording components store data signals indicative of the compilation of data and the feedback display signals to provide a feedback presentation illustrating results for the user. Switching components responsive to the data signals are included for causing the recoding components to store personal data signals for a certain user along with selected ones of the feedback display signals corresponding to the stored performance data signals in a certain sequence.

26 Claims, 17 Drawing Sheets

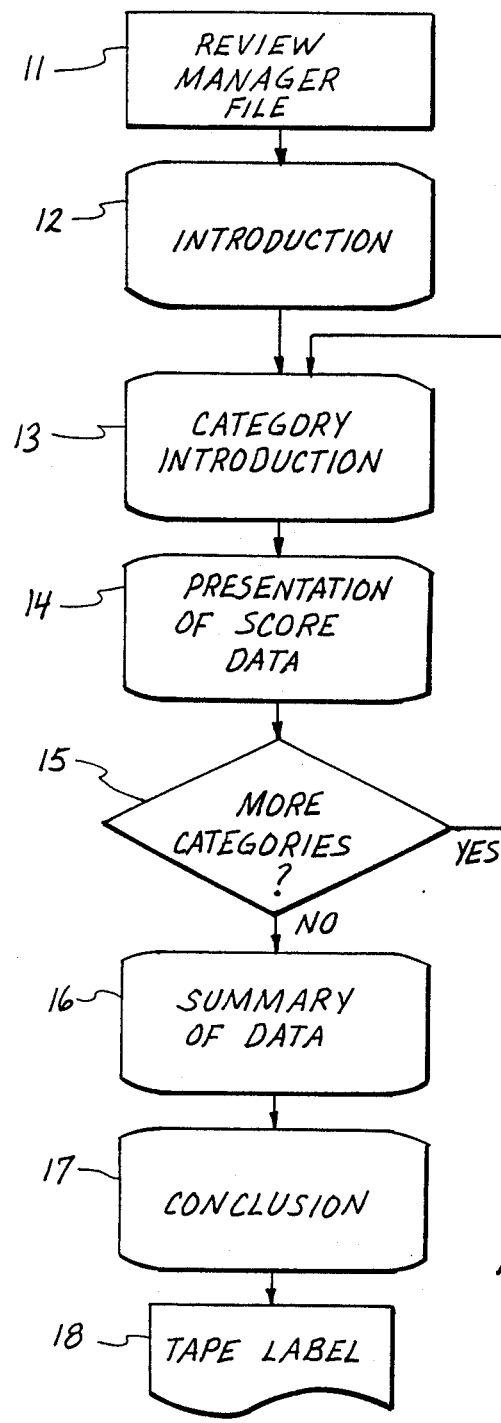

| | Very Satisfied | Satisfied | Neither Satisfied nor Dissatisfied | Dissatisfied | Very Dissatisfied |
|---|---|---|---|---|---|
| Consider your own effectiveness in the following activities. How satisfied are others with the way you... | | | | | |
| 1. Make sure the rules are clearly understood? | VS | S | N | D | VD |
| 2. Know who our customers are? | VS | S | N | D | VD |
| 3. Know and support the mission of the overall organization? | VS | S | N | D | VD |
| 4. Stand up for your personal beliefs? | VS | S | N | D | VD |
| 5. Consistently show respect and concern for people as individuals? | VS | S | N | D | VD |
| 6. Give appropriate orientation to people in new assignments? | VS | S | N | D | VD |
| 7. Consistently treat the users of our products/services as a top priority? | VS | S | N | D | VD |
| 8. Describe higher level managers in a positive way? | VS | S | N | D | VD |
| 9. Show a high degree of personal integrity in dealing with others? | VS | S | N | D | VD |
| 10. Collaborate appropriately in setting objectives? | VS | S | N | D | VD |
| 11. Effectively analyze performance? | VS | S | N | D | VD |
| 12. Keep the work simple enough to be understood and implemented? | VS | S | N | D | VD |
| 13. Understand the basic values of the organization? | VS | S | N | D | VD |
| 14. Encourage and accept constructive criticism? | VS | S | N | D | VD |
| 15. Delegate when you should? | VS | S | N | D | VD |
| 16. Encourage suggestions for improving productivity? | VS | S | N | D | VD |
| 17. Communicate a positive sense of urgency about getting the job done? | VS | S | N | D | VD |
| 18. Encourage efforts to simplify procedures? | VS | S | N | D | VD |
| 19. Are dedicated to meeting the needs of people who use our services/products? | VS | S | N | D | VD |
| 20. Discourage destructive comments about the organization? | VS | S | N | D | VD |
| 21. Take responsibility and ownership for your decisions? | VS | S | N | D | VD |
| 22. Give positive recognition for achievement without discomfort to either party? | VS | S | N | D | VD |
| 23. Take the time to answer questions and explain decisions? | VS | S | N | D | VD |
| 24. Tie individual objectives to larger organizational goals? | VS | S | N | D | VD |
| 25. Clearly communicate the importance of people who use our products/services? | VS | S | N | D | VD |

© Copyright 1983
Keilty, Goldsmith & Boone

FIG 7

| | How satisfied are others with the way you... | Very Satisfied | Satisfied | Neither Satisfied nor Dissatisfied | Dissatisfied | Very Dissatisfied |
|---|---|---|---|---|---|---|
| 26. | Avoid destructive comments about higher level managers? | VS | S | N | D | VD |
| 27. | Present yourself in a positive manner? | VS | S | N | D | VD |
| 28. | Encourage participation in decision-making when appropriate? | VS | S | N | D | VD |
| 29. | Develop specific plans when performance needs improving? | VS | S | N | D | VD |
| 30. | Break work into achievable components? | VS | S | N | D | VD |
| 31. | Manage using the basic values of the organization? | VS | S | N | D | VD |
| 32. | Are willing to admit your own mistakes? | VS | S | N | D | VD |
| 33. | Give people the freedom they need to do their job well? | VS | S | N | D | VD |
| 34. | Provide opportunities for others to try out new ideas? | VS | S | N | D | VD |
| 35. | Emphasize the importance of day-to-day progress? | VS | S | N | D | VD |
| 36. | Are committed to excellence in task achievement? | VS | S | N | D | VD |
| 37. | Give specific directions when needed? | VS | S | N | D | VD |
| 38. | Encourage and listen to input from the people who use our services/products? | VS | S | N | D | VD |
| 39. | Are honest and positive in describing organizational benefits? | VS | S | N | D | VD |
| 40. | Take reasonable risks in trying out your new ideas? | VS | S | N | D | VD |
| 41. | Adequately reward and reinforce top performance? | VS | S | N | D | VD |
| 42. | Build people's ability and understanding? | VS | S | N | D | VD |
| 43. | Concentrate on achieving what is most important? | VS | S | N | D | VD |
| 44. | Do not allow destructive comments about the people who use our products/services? | VS | S | N | D | VD |
| 45. | Personally support higher level management decisions? | VS | S | N | D | VD |
| 46. | Demonstrate confidence in yourself as a manager? | VS | S | N | D | VD |
| 47. | Build and maintain people's confidence? | VS | S | N | D | VD |
| 48. | Strive to improve people's performance from acceptable to excellent? | VS | S | N | D | VD |
| 49. | Encourage others to operate using the basic values of the organization? | VS | S | N | D | VD |
| 50. | Act on constructive advice in a timely manner? | VS | S | N | D | VD |

© Copyright 1983
Keilty, Goldsmith & Boone

FIG 8

| | Very Satisfied | Satisfied | Neither Satisfied nor Dissatisfied | Dissatisfied | Very Dissatisfied |
|---|---|---|---|---|---|
| How satisfied are others with the way you... | | | | | |
| 51. Encourage others to take as much responsibility as they can handle?.... | VS | S | N | D | VD |
| 52. Act on ideas and suggestions from others in a timely manner?.......... | VS | S | N | D | VD |
| 53. Encourage taking action to get things done? ......................... | VS | S | N | D | VD |
| 54. Make the task meaningful and relevant?.............................. | VS | S | N | D | VD |
| 55. Supervise closely when necessary? ................................. | VS | S | N | D | VD |
| 56. Act to solve customers' (users') problems in a timely manner? | VS | S | N | D | VD |
| 57. Inspire pride in the organization? .................................... | VS | S | N | D | VD |
| 58. Are more concerned with achieving excellence than "playing it safe"? ... | VS | S | N | D | VD |
| 59. Make people feel like "winners"? .................................... | VS | S | N | D | VD |
| 60. Provide coaching and guidance when it is needed? ................... | VS | S | N | D | VD |
| 61. Place greater emphasis on accomplishing the mission than following procedures?............................................................. | VS | S | N | D | VD |
| 62. Are more committed to customers' (users') long-term satisfaction than our short-term gain? ................................................. | VS | S | N | D | VD |
| 63. Do not "pass the buck" or blame higher level management?............ | VS | S | N | D | VD |
| 64. Avoid destructive self-criticism? ..................................... | VS | S | N | D | VD |
| 65. Provide continuing support when it is needed? ...................... | VS | S | N | D | VD |
| 66. Give developmental performance feedback in a timely manner? ........ | VS | S | N | D | VD |
| 67. Take corrective action when basic organizational values are compromised?........................................................... | VS | S | N | D | VD |
| 68. Do not discourage people from giving you constructive criticism?........ | VS | S | N | D | VD |
| 69. Take appropriate risks in letting others make decisions? ............... | VS | S | N | D | VD |
| 70. Avoid taking credit for the ideas of others? ........................... | VS | S | N | D | VD |
| 71. Concentrate on meeting deadlines?................................. | VS | S | N | D | VD |
| 72. Do not downplay the importance of our work? ....................... | VS | S | N | D | VD |
| 73. Maintain tight controls when they are needed? ...................... | VS | S | N | D | VD |
| 74. Avoid destructive comments about people at work?................... | VS | S | N | D | VD |
| 75. Avoid unnecessary complications? ................................. | VS | S | N | D | VD |

© Copyright 1983
Keilty, Goldsmith & Boone

FIG 9

Consider this manager's effectiveness in the following activities.
How satisfied are you with the way this manager....

|     |                                                                                          | Very Satisfied | Satisfied | Neither Satisfied nor Dissatisfied | Dissatisfied | Very Dissatisfied |
|-----|------------------------------------------------------------------------------------------|----|---|---|---|----|
| 1.  | Makes sure the rules are clearly understood?                                             | VS | S | N | D | VD |
| 2.  | Knows who her/his customers are?                                                         | VS | S | N | D | VD |
| 3.  | Knows and supports the mission of the overall organization?                              | VS | S | N | D | VD |
| 4.  | Stands up for his/her personal beliefs?                                                  | VS | S | N | D | VD |
| 5.  | Consistently shows respect and concern for people as individuals?                        | VS | S | N | D | VD |
| 6.  | Gives appropriate orientation to people in new assignments?                              | VS | S | N | D | VD |
| 7.  | Consistently treats the users of our products/services as a top priority?                | VS | S | N | D | VD |
| 8.  | Describes higher level managers in a positive way?                                       | VS | S | N | D | VD |
| 9.  | Shows a high degree of personal integrity in dealing with others?                        | VS | S | N | D | VD |
| 10. | Collaborates appropriately in setting objectives?                                        | VS | S | N | D | VD |
| 11. | Effectively analyzes performance?                                                        | VS | S | N | D | VD |
| 12. | Keeps the work simple enough to be understood and implemented?                           | VS | S | N | D | VD |
| 13. | Understands the basic values of the organization?                                        | VS | S | N | D | VD |
| 14. | Encourages and accepts constructive criticism?                                           | VS | S | N | D | VD |
| 15. | Delegates when he/she should?                                                            | VS | S | N | D | VD |
| 16. | Encourages suggestions for improving productivity?                                       | VS | S | N | D | VD |
| 17. | Communicates a positive sense of urgency about getting the job done?                     | VS | S | N | D | VD |
| 18. | Encourages efforts to simplify procedures?                                               | VS | S | N | D | VD |
| 19. | Is dedicated to meeting the needs of people who use our services/products?               | VS | S | N | D | VD |
| 20. | Discourages destructive comments about the organization?                                 | VS | S | N | D | VD |
| 21. | Takes responsibility and ownership for his/her decisions?                                | VS | S | N | D | VD |
| 22. | Gives positive recognition for achievement without discomfort to either party?           | VS | S | N | D | VD |
| 23. | Takes the time to answer questions and explain decisions?                                | VS | S | N | D | VD |
| 24. | Ties individual objectives to larger organizational goals?                               | VS | S | N | D | VD |
| 25. | Clearly communicates the importance of people who use our products/services?             | VS | S | N | D | VD |

© Copyright 1983
Keilty, Goldsmith & Boone

FIG 10

| How satisfied are you with the way this manager... | Very Satisfied | Satisfied | Neither Satisfied nor Dissatisfied | Dissatisfied | Very Dissatisfied |
|---|---|---|---|---|---|
| 26. Avoids destructive comments about higher level managers? | VS | S | N | D | VD |
| 27. Presents herself/himself in a positive manner? | VS | S | N | D | VD |
| 28. Encourages participation in decision-making when appropriate? | VS | S | N | D | VD |
| 29. Develops specific plans when performance needs improving? | VS | S | N | D | VD |
| 30. Breaks work into achievable components? | VS | S | N | D | VD |
| 31. Manages using the basic values of the organization? | VS | S | N | D | VD |
| 32. Is willing to admit his/her own mistakes? | VS | S | N | D | VD |
| 33. Gives people the freedom they need to do their job well? | VS | S | N | D | VD |
| 34. Provides opportunities for others to try out new ideas? | VS | S | N | D | VD |
| 35. Emphasizes the importance of day-to-day progress? | VS | S | N | D | VD |
| 36. Is committed to excellence in task achievement? | VS | S | N | D | VD |
| 37. Gives specific directions when needed? | VS | S | N | D | VD |
| 38. Encourages and listens to input from the people who use our services/products? | VS | S | N | D | VD |
| 39. Is honest and positive in describing organizational benefits? | VS | S | N | D | VD |
| 40. Takes reasonable risks in trying out his/her new ideas? | VS | S | N | D | VD |
| 41. Adequately rewards and reinforces top performance? | VS | S | N | D | VD |
| 42. Builds people's ability and understanding? | VS | S | N | D | VD |
| 43. Concentrates on achieving what is most important? | VS | S | N | D | VD |
| 44. Does not allow destructive comments about the people who use our products/services? | VS | S | N | D | VD |
| 45. Personally supports higher level management decisions? | VS | S | N | D | VD |
| 46. Demonstrates confidence in herself/himself as a manager? | VS | S | N | D | VD |
| 47. Builds and maintains people's confidence? | VS | S | N | D | VD |
| 48. Strives to improve people's performance from acceptable to excellent? | VS | S | N | D | VD |
| 49. Encourages others to operate using the basic values of the organization? | VS | S | N | D | VD |
| 50. Acts on constructive advice in a timely manner? | VS | S | N | D | VD |

© Copyright 1983
Keilty, Goldsmith & Boone

FIG 11

How satisfied are you with the way this manager...

| | Very Satisfied | Satisfied | Neither Satisfied nor Dissatisfied | Dissatisfied | Very Dissatisfied |
|---|---|---|---|---|---|
| 51. Encourages others to take as much responsibility as they can handle? | VS | S | N | D | VD |
| 52. Acts on ideas and suggestions from others in a timely manner? | VS | S | N | D | VD |
| 53. Encourages taking action to get things done? | VS | S | N | D | VD |
| 54. Makes the task meaningful and relevant? | VS | S | N | D | VD |
| 55. Supervises closely when necessary? | VS | S | N | D | VD |
| 56. Acts to solve customers' (users') problems in a timely manner? | VS | S | N | D | VD |
| 57. Inspires pride in the organization? | VS | S | N | D | VD |
| 58. Is more concerned with achieving excellence than "playing it safe"? | VS | S | N | D | VD |
| 59. Makes people feel like "winners"? | VS | S | N | D | VD |
| 60. Provides coaching and guidance when it is needed? | VS | S | N | D | VD |
| 61. Places greater emphasis on accomplishing the mission than following procedures? | VS | S | N | D | VD |
| 62. Is more committed to customers' (users') long-term satisfaction than our short-term gain? | VS | S. | N | D | VD |
| 63. Does not "pass the buck" or blame higher level management? | VS | S | N | D | VD |
| 64. Avoids destructive self-criticism? | VS | S | N | D | VD |
| 65. Provides continuing support when it is needed? | VS | S | N | D | VD |
| 66. Gives developmental performance feedback in a timely manner? | VS | S | N | D | VD |
| 67. Takes corrective action when basic organizational values are compromised? | VS | S | N | D | VD |
| 68. Does not discourage people from giving him/her constructive criticism? | VS | S | N | D | VD |
| 69. Takes appropriate risks in letting others make decisions? | VS | S | N | D | VD |
| 70. Avoids taking credit for the ideas of others? | VS | S | N | D | VD |
| 71. Concentrates on meeting deadlines? | VS | S | N | D | VD |
| 72. Does not downplay the importance of our work? | VS | S | N | D | VD |
| 73. Maintains tight controls when they are needed? | VS | S | N | D | VD |
| 74. Avoids destructive comments about people at work? | VS | S | N | D | VD |
| 75. Avoids unnecessary complications? | VS | S | N | D | VD |

© Copyright 1983
Keilty, Goldsmith & Boone

FIG 12

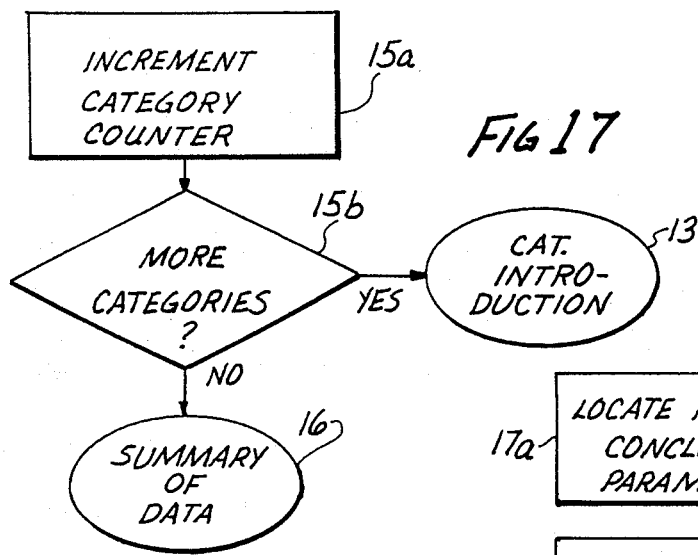
FIG 17
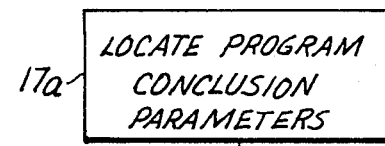
FIG 19
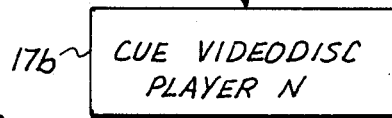
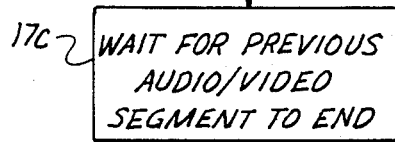
FIG 20
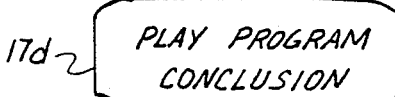
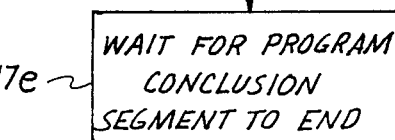
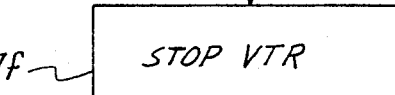

PERSONALIZED FEEDBACK SYSTEM UTILIZING PRE-RECORDED MEDIA AND METHOD OF MAKING SAME

BACKGROUND OF THE INVENTION

1. Technical Field

This invention relates generally to personalized feedback systems, and particularly to such a system that employs pre-recorded media for presenting personalized information to a user.

2. Background Art

Recognized as essential to business success, competent management is in constant demand, and many management training aids have been devised to develop the skill of the manager. By training the individual manager and potential managers, the company benefits from greater manager expertise, while helping the manager grow professionally.

One particularly effective system with many innovative features, is described in copending and commonly assigned U.S. patent application Ser. No. 790,297, filed Oct. 22, 1985, and incorporated herein by reference. The system described in that application employs a data delivery medium, such as a floppy diskette, and an available computer system, such as a personal computer coupled to a video disc player, for presenting personalized survey information and corresponding motion picture vignettes to a user in a highly effective, self-training, video format.

However, it is desirable to have a less expensive means of presenting the information, to enable more widespread use of the training system. Such a system would, at the same time, include at least the basic features of the system disclosed in the foregoing copending patent application.

SUMMARY OF INVENTION

Therefore, the principal object of the present invention is to provide a new and improved feedback system, which employs a relatively less expensive means of presenting personalized feedback information to a user.

It is a further object to provide such a new and improved system, which enables use of widely available playback equipment.

Yet another object of the present invention is to provide such a new and improved system, which employs the basic features described in the above mentioned copending patent application, while avoiding the need to use relatively expensive computer-controlled interactive video display components, such as laser disc players.

Briefly, the above and further objects of the present invention are realized by providing a novel personalized feedback system. In one form of the invention, the system employs a motion picture recording arrangement, such as a videotaping arrangement, to enable the user to play back a personalized videotape on a conventional videotape recorder. Survey questionnaires are provided for enabling procurement of performance data indicative of the performance of a user to be trained, and compilation components are included for providing computer-readable performance data signals indicative of a compilation of data procured with the survey questionaires for an individual user.

Feedback presentation memory components store a group of pre-recorded feedback display signals that are indicative of a group of motion picture vignettes illustrative of various consequences likely to accompany a variety of performance traits. Recording components store performance data signals indicative of the compilation of data and the feedback display signals to provide a feedback presentation illustrating consequences likely to accompany the past performance of a certain user.

Switching components responsive to the performance data signals are included for causing the recording components to store performance data signals for a certain user along with selected ones of the feedback display signals corresponding to the stored performance data signals in a certain sequence.

In order to make the pre-recorded media in one form of the invention, a personal computer synchronously transfers selected information from a series of videodisc players to a videotape recorder. At the same time, computer-generated graphics overlays are provided as desired.

Thus, the system of this invention provides an easier and far less expensive feedback approach. By employing a pre-recorded video cassette recording, the system enables more convenient user review of the feedback presentation on widely-available conventional video cassette recorders.

BRIEF DESCRIPTION OF THE DRAWINGS

The above and other objects and features of this invention and the manner of attaining them will become apparent, and the invention itself will be best understood, by reference to the following description of an embodiment of the invention taken in conjunction with the accompanying drawings, wherein:

FIG. 2 is a flowchart diagram illustrating a computer program for controlling the sequence of making the pre-recorded media generated by the recording arrangement of FIG. 1A;

FIGS. 7-12 are face views of survey devices in the form of questionnaires forming a part of the system of FIG. 1; and FIGS. 13-20 are detailed flowchart diagrams illustrating a computer program of FIG. 2.

DESCRIPTION OF THE PREFERRED EMBODIMENTS

The detailed description is organized according to the following outline;

A. SYSTEM OVERVIEW
B. GENERAL VIDEOTAPING SYSTEM

C. DETAILED HARDWARE DESCRIPTION
D. SURVEY INSTRUMENTS
E. COMPUTER SOFTWARE

A. SYSTEM OVERVIEW

Figure 1:
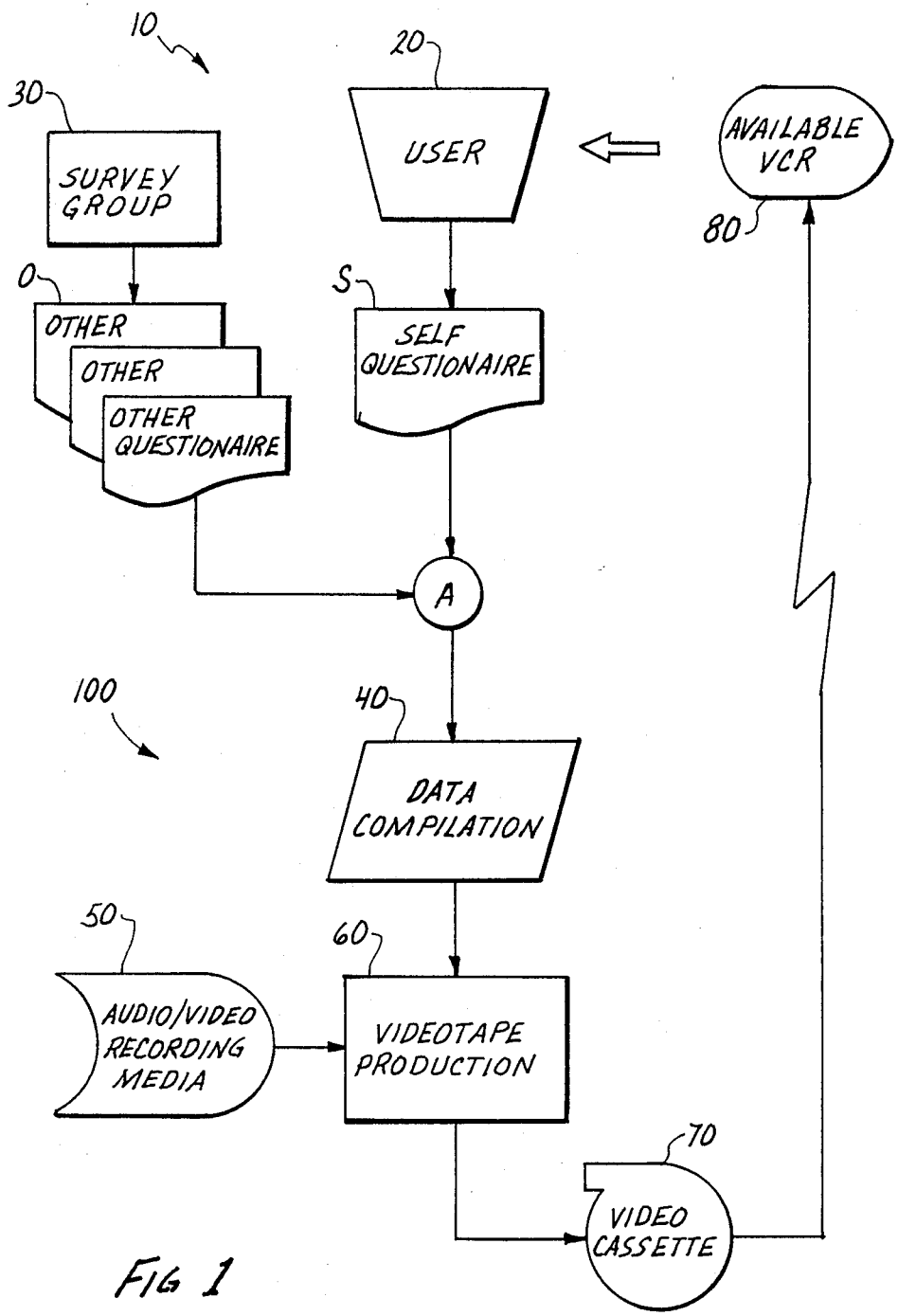
FIG. 1 is a functional block diagram of a performance appraisal and training system constructed according to the invention.

Referring now to the drawings, and more particularly to FIG. 1, there is shown a performance appraisal and training system 10, which is constructed according to the invention.

Operation of the system 10 commences with a user 20 completing a SELF questionnaire S and having each member of a group of three or more coworkers, designated as a survey group 30, complete one of a plurality of OTHER performance appraisal survey questionnaires O.

The completed questionnaires are gathered at point A in FIG. 1, and compiled according to the step at 40 to produce computer-readable performance data signals indicative of a compilation of the data procured with, and stored in the survey questionnaires "S" and "O", in the form of pencil or ink notations thereon, as hereinafter described in greater detail The data compilation operation 40 forms a part of a videotaping operation generally indicated at 100, which also includes videotape production 60.

A recording media 50 stores a group of pre-recorded feedback display signals These display signals are indicative of a group of motion pictures vignettes that illustrate various consequences likely to accompany a variety of performance traits. The stored display signals also include video and audio introduction information signals, to provide, when played back, an introductory portion.

The media 50 is then recorded on during a recording production, as indicated at the videotape production 60. The desired videotaped feedback presentation is recorded on a videocasette indicated at 70. The feedback presentation incorporates a compilation of the performance appraisal data, together with selected corresponding ones of the motion picture vignettes and introductions, to illustrate consequences likely to accompany the past performance of the user.

The video cassette may then be delivered to the user for use on an available video cassette recorder, such as the one indicated at 80 in FIG. 1. Enabling the user to view the video cassette in this manner, increases the ease and convenience of the system while decreasing the cost and number of special components required of the user.

It should be understood that the use of the system 10 is very similar to the system disclosed in the foregoing copending patent application. Instead of employing a computer functioning interactively with a laser disc player, the user 20 of the system 10 merely uses the video cassette 70 with the cassette player 80. As hereinafter mentioned, the user 20 can pause the video presentation to study printed copies (not shown) of reports, summarizing the results of the survey.

B. GENERAL VIDEOTAPING SYSTEM

Figure 1A:
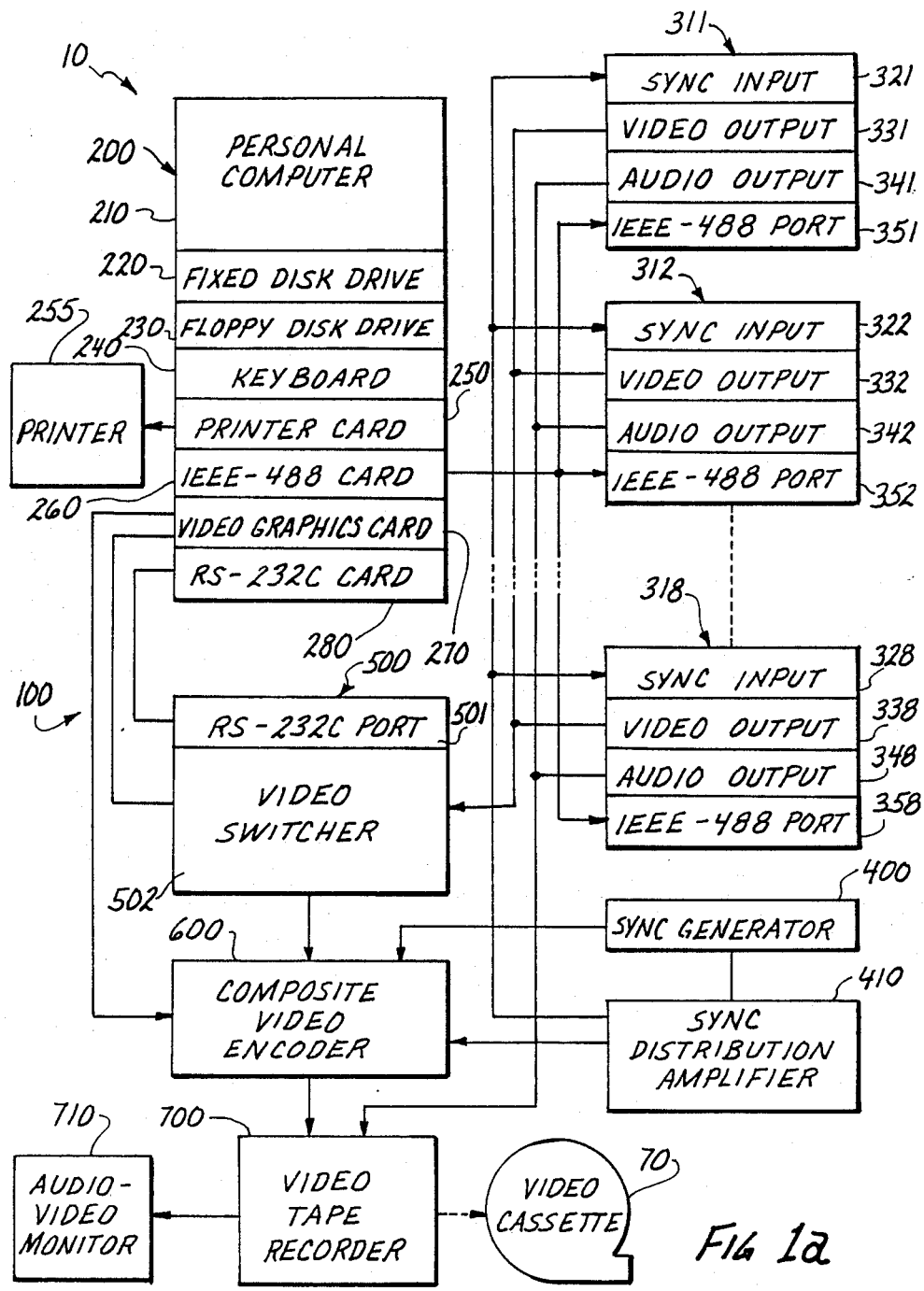
FIG. 1A is a block diagram of a motion picture recording arrangement for making pre-recorded motion picture media for use in the system of FIG. 1.

A general block diagram of the videotaping system 100 is illustrated in FIG. 1A.

The videotaping operation 100 employs a personal computer generally indicated at 200, such as the model sold by IBM Corporation of New York, under the trade name "IBM PC/AT." It will become apparent to those skilled in the art that other type and kinds of computers may also be employed in accordance with the present invention.

The personal computer 200 includes a microcomputer processor unit 210, having a fixed disc drive 220, a floppy disk drive 230, a keyboard 240, and a printer card 250. Printer 255 is connected in a conventional manner to personal computer 200 via printer card 250.

The personal computer 200 also includes an IEEE-488 card 260, a videographics card 270, and an RS-232C card 280. These components are all well-known, conventional components.

A series of video disc players 311–318 combine with sync generator 400, sync amplifier 410, video switcher 500, and personal computer 200 to enable computer-control selection of pre-recorded feedback display signals stored on a series of video discs (not shown).

A composite video encoder 600 creates a recordable composite video signal from video signals selected from the video disc players 311–318 and graphics information provided by the personal computer 200. In this regard, the graphics information may be alpha-numeric information indicative of the summary of the survey information recorded on the questionnaires S and O (FIG. 1), and entered into the computer 200.

Videotape recoder 700 then rerecords these signals on a suitable recording medium such as video cassette 70, while audio-video monitor 710 enables an operator to monitor the quality of the tape being produced.

The video disc players 311–318 may be Sony LDP-2000-3 video disc player. The video switcher 500 is a Dynair SVA-501A 16×1 Video switcher.

The videotape recorder 700 may be a conventional ¾-inch recorder capable of producing a video cassette that is compatible with conventional home video cassette recording equipment. The audio-video monitor 710 may be a Sony PVM-1271Q audio-video monitor.

These components are interconnected generally as indicated in FIG. 1A, and used with suitable programming to produce the pre-recorded cassette 70. The videotaping system selects and plays back audio/video segments, graphics, music, narration from the video disc player, and special effects from the switcher 502. Additionally, the computer may create and present computer-generated graphics as indicated by the presentation sequence.

The presentation sequence or format of the information recorded onto the video cassette 70, is controlled by the computer program stored in the computer 200, and is illustrated in FIG. 2. The program begins with a review of the manager file as indicated at step 11. This enables the system to review the data to select the presentation types to be used. The feedback presentation then proceeds with a recording of an introduction on the cassette 70, as indicated at step 12 in FIG. 2.

Then, various categories are then stored on the cassette for introduction to the user, as indicated at step 13, with the survey data being recorded then for presentation as indicated at step 14. This continues, as shown at the decision step 15, until all categories have been recorded, and then the summarized data is recorded, as indicated at step 16.

Finally, a narrator's concluding remarks are recorded, as indicated at step 17, with the cassette then being removed from the videotape recorder, labelled (step 18), and, along with an associated printout, sent to the user who filled out the SELF questionnaire. The label (not shown) is printed by the printer 255. If indicated by the data, the user may also be provided with instructional material to be used, after viewing the confidential report presented by the cassette 70.

C. DETAILED HARDWARE DESCRIPTION

Figure 4:
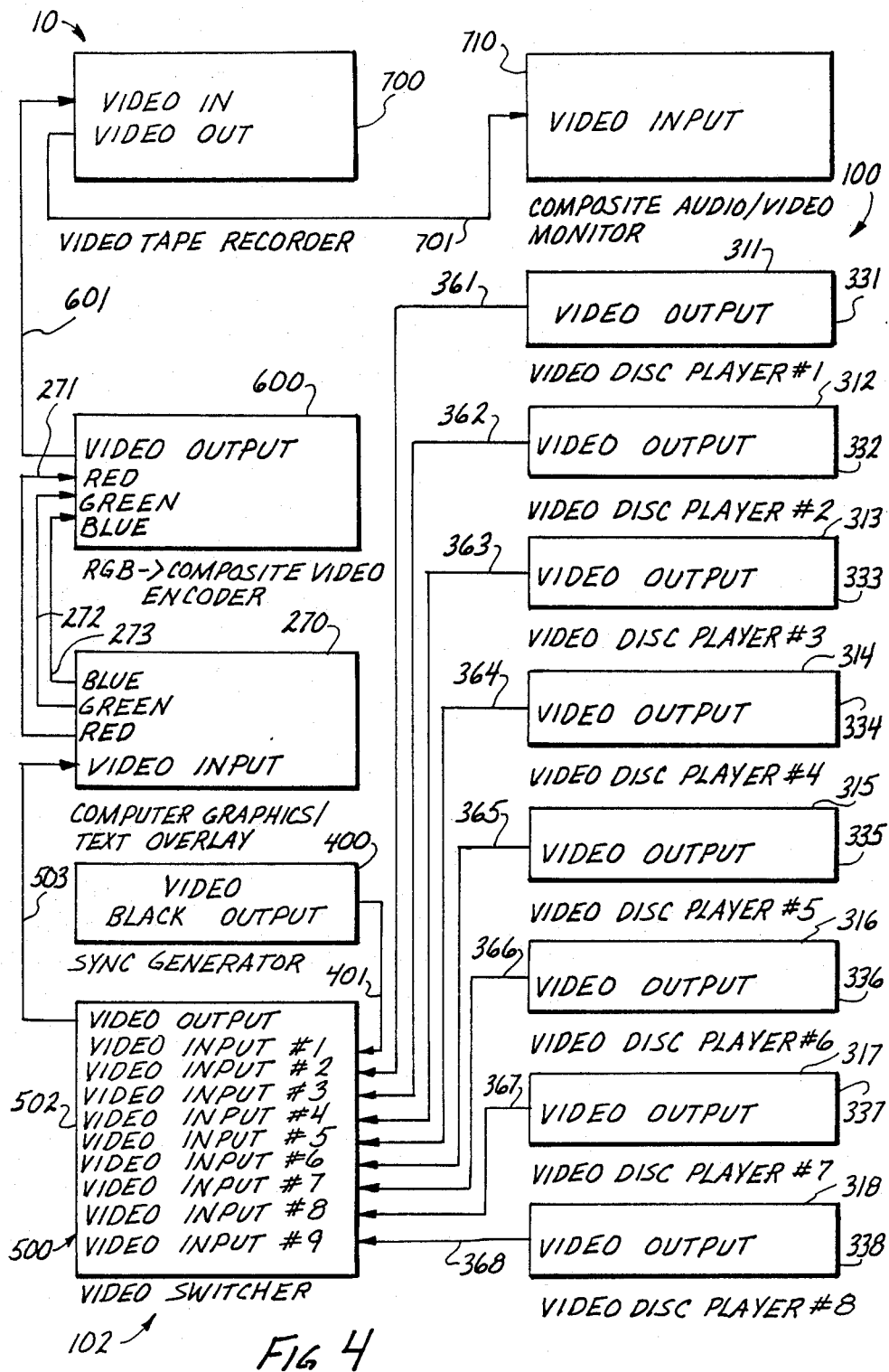
FIG. 4 is a detailed block diagram of the video subsystem portion of the recording arrangement of FIG. 1A.
Figure 5:
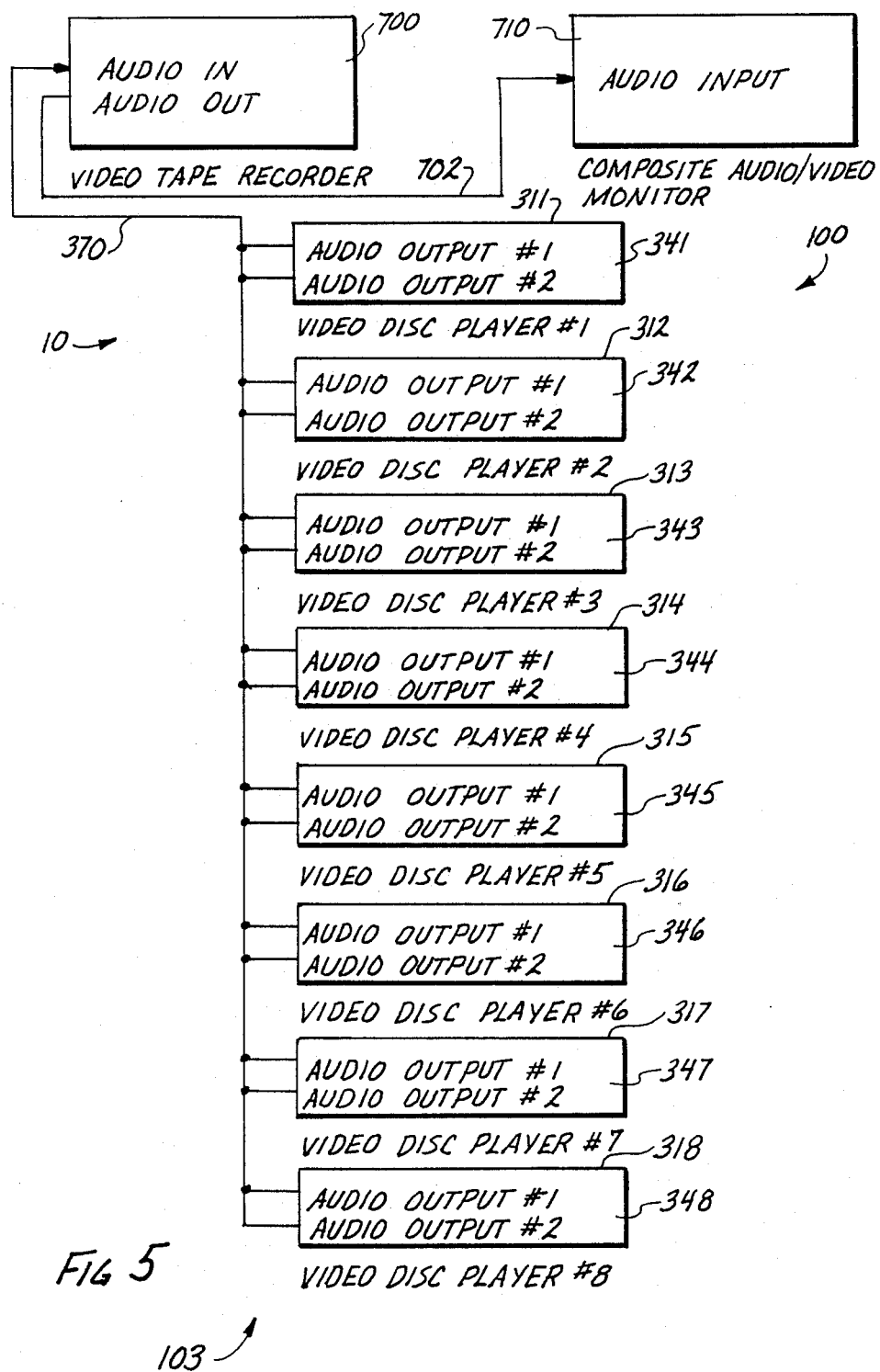
FIG. 5 is a detailed block diagram of the audio subsystem portion of the recording arrangement of FIG. 1A.
Figure 6:
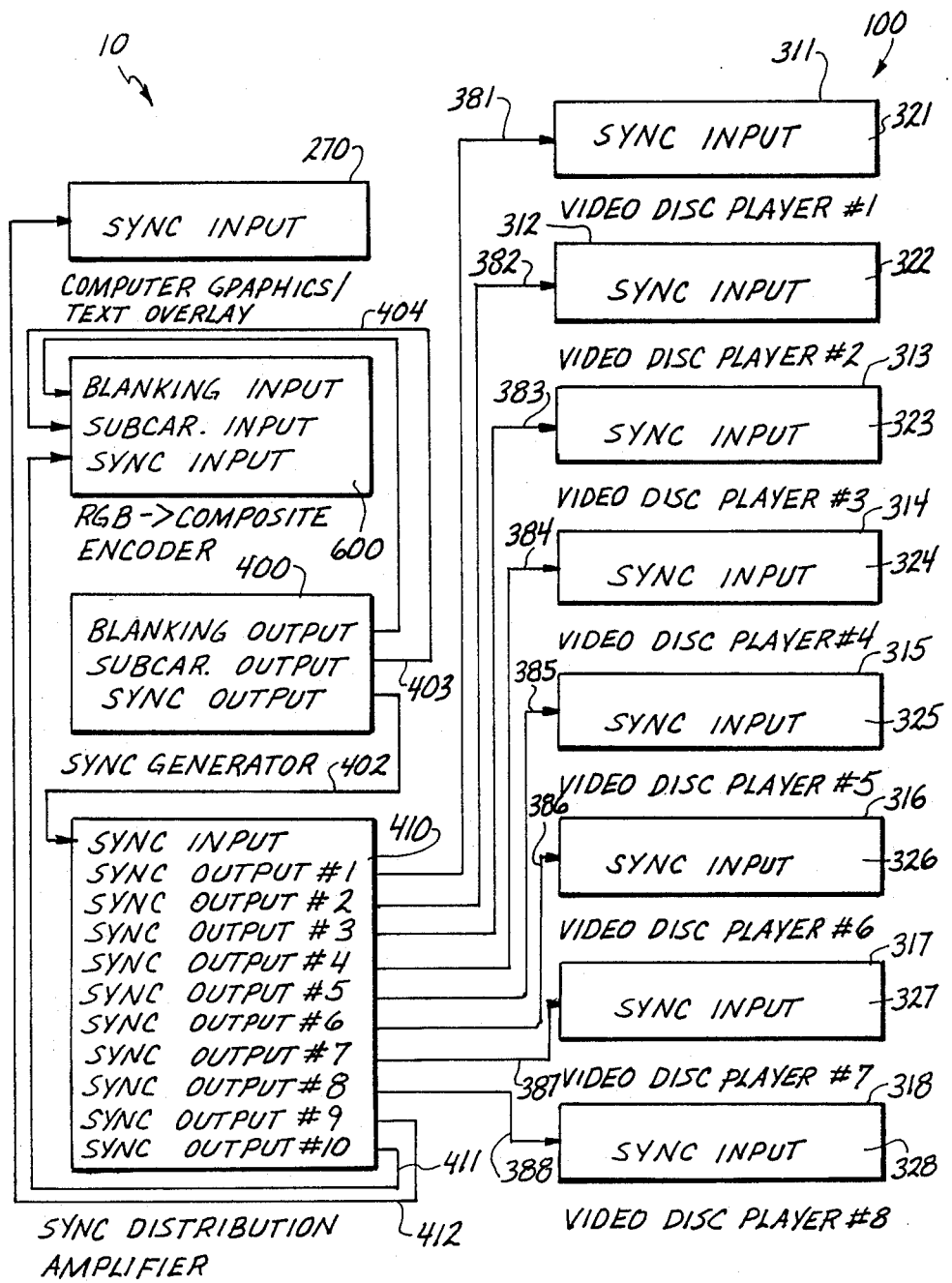
FIG. 6 is a detailed block diagram of the synchronization subsystem portion of the recording arrangement of FIG. 1A.

The videotaping system 100 includes the four portions illustrated in FIGS. 3-6, namely, a control subsystem portion 101 (FIG. 3), a video subsystem portion 102 (FIG. 4), an audio subsystem portion 103 (FIG. 5), and a synchronizing subsystem portion 104 (FIG. 6).

Figure 3:
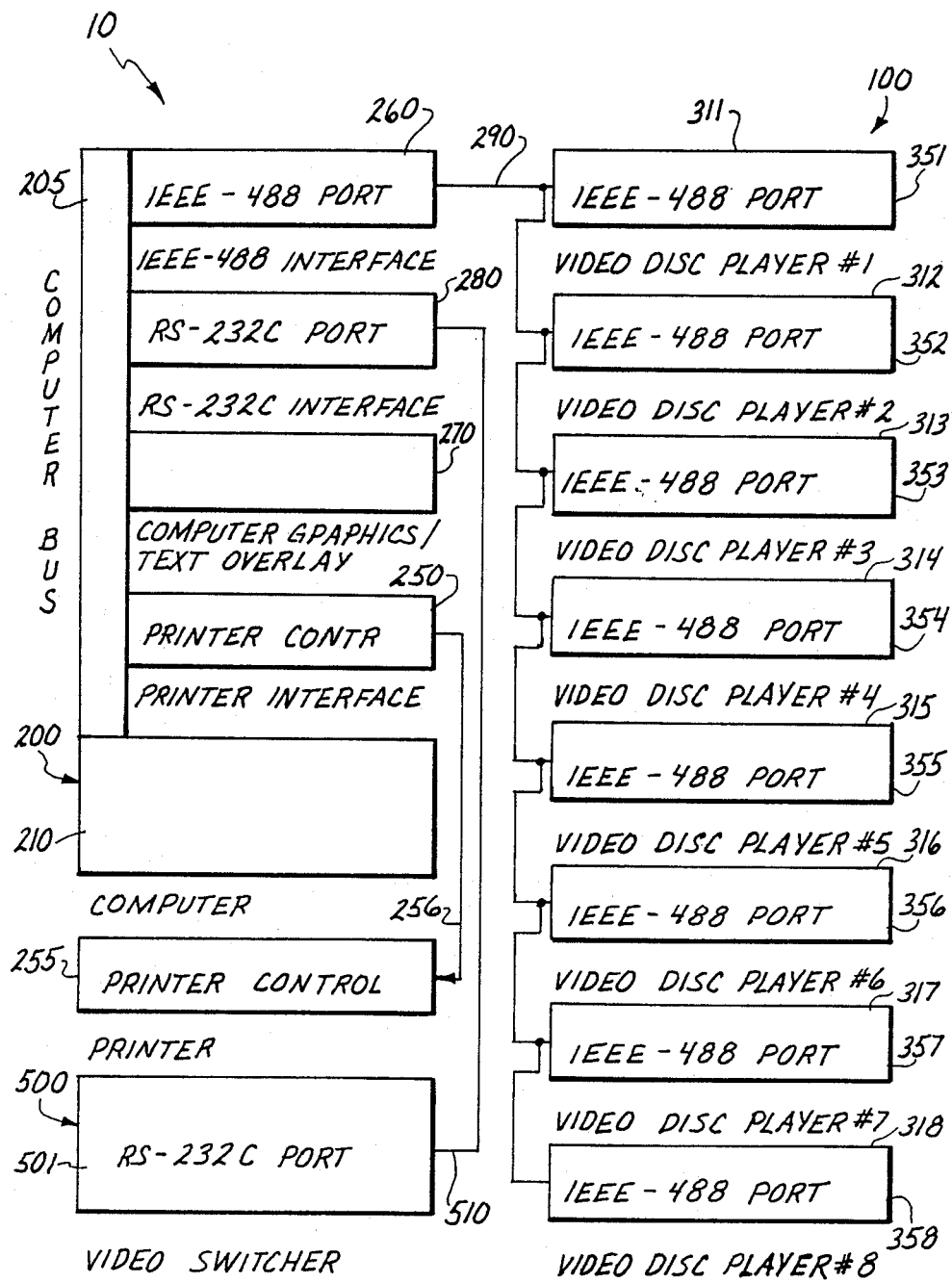
FIG. 3 is a detailed block diagram of the control subsystem portion of the recording arrangement of FIG. 1A.

FIG. 3 illustrates the component interconnections related to the control subsystem portion 101. The video disc players illustrated in FIG. 1A (players 311–318) include a group of IEEE-488 ports 351–358 (FIGS. 1A and 3). Each of these ports is serially interconnected in a "daisy chain" by suitable cables, and are connected by a cable 290 to card 260 on personal computer 200.

The discs of the players store introduction information, positive and negative motion picture vignettes information, conclusion information, and voice over audio information. In order to access this information selectively, messages are sent from the computer to selected ones of the players The message typically includes a search command for beginning and terminating frames In this manner, one player can be cause to play back a segment, and then the next player can be placed in a ready state on a queque.

Video switcher 500 includes an RS-232C port 501 (FIGS. 1A and 3) which is interconnected by suitable cable means illustrated by line 510 to corresponding RS-232C card 280 of the personal computer 200.

In addition, printer 255 is interconnected by suitable cable means, line 256, to printer card 250 (FIGS. 1A and 3).

Computer graphics card 270 is connected along with card 260, card 280, and card 250, to computer bus 205. Cumputer bus 205, in turn, interconnects these cards with the central processing unit 210 of the personal computer 200.

Interconnected in this manner, the IEEE-488 card 260 is used to exercise control over the video disc recorders 311–318. Using this configuration, it is possible to control from one up to 15 video disc machines with one IEEE-488 card 260. Eight video disc players are shown for illustration only. The actual number of video disc players used may be increased according to the number of source video discs needed to produce a specific customized videotape. A fewer numbers of players may also be employed.

The video subsystem 102 interconnections of videotaping system 100 are shown in FIG. 4. Each of the video disc players 311–318, includes a video output, video output 331–338 (FIGS. 1A and 4). These video outputs 331–338 are interconnected by suitable cables to the switcher portion 502 of video switcher 500. Lines 361–368 illustrate these interconnections.

Sync generator 400 is interconnected by suitable cables illustrated by a line 401 to switcher portion 502 to provide a video black signal to the video switcher 500. A selected video signal from a selected one of video outputs 331–338 and 401, is coupled from switcher portion 502 by a suitable cable illustrated by line 503 to computer graphics card 270. Red, green, and blue video signals are then coupled from computer graphics card 270 by suitable cables 271, 272, and 273 to the input to the composite video encoder 600.

Output from the composite video encoder 600 is transmitted by a suitable cable 601, to the video input of tape recorder 700. Tape recorder 700, in turn, records the video signal on a suitable medium such as the conventional video cassette 70 (FIG. 1).

A video output signal is coupled from video tape recorder 700 by a cable 701, to the video input of a composite audio/video monitor 710, where signal quality can be monitored The computer graphics card 270 employs three separate modes of operation They comprise a video straight through mode from the players, an overlay mode from the computer, and a computer graphics only mode from the computer.

In order to cause a visually uninterrupted flow between the video segments, all of the major components are synchronized by the sync generator 400. Thus, all of the frames of information stored on the discs of the various disc players, are played back in synchronism.

For a continuous presentation, the switcher 500 of FIG. 4, receives a switch command from the computer 200 to request the next player to come on line. However, the command is executed only upon the coincidence of the vertical blanking interval signal generated internally by the switcher 500. Thus, the switch from one player to the next, occurs during the vertical blanking interval.

The audio subsystem 103 interconnections of videotaping system 100 are illustrated in FIG. 5. Each of the video disc players 311–318 includes an audio output port, ports 341–348. Each audio output port 341–348 includes two audio output channels designated #1 and #2. These outputs are combined and transmitted by suitable cable means, line 370, to the audio input of videotape recorder 700.

The audio output of video tape recorder 700 is transmitted by suitable cable means, line 702, to the audio input of the composite audio/video monitor 710 to enable monitoring of the quality of the audio signal.

The synchronization subsystem 104 interconnections of the video taping system 100 are further illustrated in FIG. 6. Each of the video disc players 311–318 includes a sync input port, ports 321–328.

These sync input ports 321–328 are interconnected by suitable cable means, illustrated respectively by lines 381–388, to a corresponding sync output of sync distribution amplifier 410, respectively sync outputs #1 through #8. This provides an amplified sync signal according to the sync signal supplied from sync generator 400 to the sync distribution amplifier 410 over line 402.

Sync distribution amplifier 410 also provides a sync signal over line 411 from sync output #10 to the sync input of composite encoder 600, as well as a sync signal over line 412 from sync output #9 to the sync input of computer graphics card 270.

The sync generator 400 also supplies a subcarrier output signal over line 403 to the subcarrier input of composite encoder 600, as well as a blanking output signal to the blanking input of the composite encoder 600 over line 404.

D. SURVEY INSTRUMENTS

Considering now the survey instruments as shown in FIGS. 7-12, the "SELF" survey instrument S includes three pages S1, S2 and S3, as shown on respective FIGS. 7, 8, and 9. Similarly, "OTHER" survey instruments 0 for the subordinates of the manager, and includes three pages 01, 02, and 03, as shown on the respective FIGS. 10, 11, and 12.

The survey instruments are part of the system 10. The manager who is to receive the data, fills out a SELF survey instruments S (FIGS. 7-9). The manager's peers, subordinates, or other co-workers, each fill out OTHER survey instruments 0, (FIGS. 10-12). The number of OTHER instruments 0, filled out is determined by the manager, but there should be a minimum of three such surveys filled out to constitute a sample adequate to provide the desired appraisal. While three OTHER survey instruments are preferred, a fewer number may also be employed for some applications.

The self and other survey forms are collected and the answers entered into a conventional general purpose computer system (not shown) that manages the data and produces a compilation thereof, according to means known in the art. An operator may, for example, read the response data from the survey instruments and key it into the computer. It will become apparent to those skilled in the art that the keying process could be replaced with optical scanning of the instruments, or the transfer of response data from other computer systems (not shown). Once all the required surveys have been entered for a given manager, that manager's compiled data can be generated.

The compilation of information may be printed on paper or may be electronically stored as a data file.

The compiled data includes categories of questions, answered on the surveys Each question is scored by how many people responded, what the number of responses were for each of the five possible answers, and what the manager anticipated the response from his or her peers, subordinates, or other co-workers, would be. Questions are compiled into groups called "categories." For each category, a set of scores summarizing the pertinent questions is given along with an average score for the category. There are a total of nineteen 7 categories used by the computer software shown in FIGS. 9-19. Of the nineteen categories, fifteen are used in a group called the "five commitments" report, and the remaining four are used in a separate report called the "four leadership styles" report.

A summary report may be shown on the monitor 12 and may list the highest rated categories, as well as the lowest rated categories for the manager to review The following table is an example of such a report, FOLLOWED BY an appropriate list of three ways to encourage innovative ideas.

In addition, a report may be generated that may list the highest rated questions, as well as the lowest rated questions for the manager to review.

| | | Summary - The Five Commitments | |
|---|---|---|---|
| 0 | 1 | Accept Constructive Criticism | (S) |
| 0 | 2 | Building the Organization | (O) |
| 0 | 3 | Showing Concern/Recognition | (P) |
| 0 | 4 | Building Task Importance | (T) |
| 0 | 5 | Supporting Higher Management | (O) |
| 0 | 7 | Operating by the Basic Values | (O) |
| 0 | 8 | Building Customer Importance | (C) |
| 0 | 9 | Demonstrating Autonomy | (S) |
| 0 | 9 | Being Action Oriented | (T) |
| 0 | 11 | Encouraging Innovative Ideas | (P) |
| 0 | 12 | Keeping it Simple | (T) |
| 0 | 13 | Building Yourself as a Manager | (S) |
| 0 | 14 | Serving the Customer | (C) |
| 0 | 15 | Keeping the Right Focus | (T) |
| | | C = Customer, O = Organization, S = Self, P = People, T = Task | |

| | | Summary - The Four Styles | |
|---|---|---|---|
| * | 1 | S4- -Delegating (Loose Control) | |
| 0 | 2 | S3- -Supporting, Participating | |
| 0 | 3 | S2- -Guiding, Coaching | |
| 0 | 4 | S1- -Directing (Tight Control) | |

The categories in the summaries for the five commitments and four styles, are listed with the categories having the lowest average scores at the top and highest average scores at the bottom. The categories at the top of these lists are the ones that deserve the most attention. Categories that have the same rank number indicate a tie in the average. For example, refer to rank 9 of the five styles.

The following are listings of the overall summaries of both the high satisfaction items, and the low satisfaction items.

OVERALL SUMMARY

High Satisfaction Items:

(2)Knows who her/his customers are (4.4)
(19)Dedicated to meeting the needs of people who use our services/products (4.2)
(13)Understands the basic values of the organization (4.2)
(3)Knows and supports the mission of the overall organization (4.2)
(1)Makes sure the rules are clearly understood (4.2)
(73)Maintains tight controls when they are needed (4.0)
(56)Acts to solve customers' (users') problems in a timely manner (4.0)
(54)Makes the task meaningful and relevant (4.0)
(53)Encourages taking action to get things done (4.0)
(46)Demonstrates confident in herself/himself as a manager (4.0)
(45)Personally supports higher level management decisions (4.0)
(43)Concentrates on achieving what is most important (4.0)
(39)Is honest and positive in describing organizational benefits (4.0)
(38)Encourages & listens to input from those using our services/products (4.0)
(27)Presents herself/himself in a positive manner (4.0)
(20)Discourages destructive comments about the organization (4.0)
(12)Keeps the work simple enough to be understood and implemented (4.0)
(8)Describes higher level managers in a positive way (4.0)
(7)Treats the users of our products/services as a top priority (4.0)
(4)Stands up for his/her personal beliefs (4.0)

Low Satisfaction Items:

(70)Avoids taking credit for the ideas of others (2.2)
(41)Adequately rewards and reinforces top performance (2.6)
(59)Makes people feel like "winners" (2.6)
(22)Gives positive recognition for achievement without discomfort (2.8)
(40)Takes reasonable risks in trying out his/her new ideas (2.8)
(58)Is more concerned with achieving excellence than "playing it safe" (2.8)
(61)More emphasis on accomplishing the mission than following procedures (2.8)
(11)Effectively analyzes performance (3.0)
(14)Encourages and accepts constructive criticism (3.0)
(21)Takes responsibilty and ownership for his/her -continued

| Low Satisfaction Items: |
| --- |
| decisions (3.0) |
| (32)Is willing to admit his/her own mistakes (3.0) |
| (47)Builds and maintains people's confidence (3.0) |
| (62)More committed to users'long-term satisfaction than short-term gain (3.0) |
| (63)Does not "pass the buck"or blame higher level management (3.0) |
| (69)Takes appropriate risks in letting others make decisions (3.0) |
| (75)Avoids unnecessary complications (3.0) |

In the above tables, the number at the left indicates the number of the question appearing on the survey instrument. The number in parentheses indicates the average score for that question.

The following is a listing of representative suggestions displayed by the monitor 12:

| ENCOURAGING INNOVATIVE IDEAS |
| --- |
| 1. Avoid early judgment on a new idea by getting several inputs. |
| 2. Give adequate recognition for an individual with a new idea. |
| 3. Communicate the basic mission of the organization to staff and ask for ideas on how to work towards the mission. |

Considering the survey instruments in greater detail, as shown in FIGS. 7-12, there is shown both a three page set of self-appraisal questions for use in eliciting self-appraisal responses from a selected individual, and a three page set of related questions for eliciting a series of other responses from each member of a group of other individuals. Each of the six pages is designated generally by reference numeral 10, to indicate it to be a part of the illustrated system 10. They serve as a survey arrangement for enabling recording by pencil or pen notations (not shown) in the answer areas, by circling the desired answer. Thus, performance appraisal data indicative of one of the variety of performance traits, of which the vignettes are descriptive; that is, characteristic of a user to be trained, are recorded, and are subsequently entered into the computer 200 of FIG. 1A.

The page S1 is composed of paper material, and bears on its face, indicia generally indicated at Q1 and configured in the shape of twenty-five questions (1-25) illustrated in FIG. 7. The page S2 bears on its face indicia Q2 configured in the shape of twenty-five additional questions (26-50), as illustrated in FIG. 8, and the page S3 includes indicia Q3 configured as twenty-five further questions (51-75) illustrated in FIG. 9. Pages S1-3 constitute one three page survey instrument.

As shown in FIG. 7, column heading indicia designated H-1 through H-5 head five columns that enable the user to choose between five different responses for each of the questions of FIG. 7. These questions may be presented to the user to be trained in the form of a survey instrument for the user to read and respond to in private, and the user simply circles the desired response Similar heading indicia are employed for the remaining five survey pages.

It serves as means for enabling the user to record in private a series of self-appraisal responses to a series of performance appraisal questions.

FIGS. 10-12 illustrate another three page set containing related question indicia Q4 through Q6. The indicia are configured to present twenty-five questions on each page, combined constitute a second survey instrument for enabling each member of a group of other individuals to record in private, a series of other responses to a related series of questions. Thus, the page O1 of the instrument O, includes indicia configured in the shape of twenty-five questions (1-25) as illustrated in FIG. 10 that is designated generally by the letter "O" for Other, and particularly as O1, along with the page O2 of twenty-five questions (26-50) illustrated in FIG. 11, and the page O3 of twenty-five questions (51-75) illustrated in FIG. 12, form a three page survey instrument suitable for this purpose. As with the first survey instrument, five columns are included, and each question is followed by five alternate responses which may be chosen by the user completing the survey instrument.

An inventory is taken using these instruments. The inventory comprises a series of questions about the management techniques and methods used. These questions appear in two forms: one survey instrument, form OTHER, asks other people to record their perceptions about the user's management practices, and the second survey instrument, Form SELF, which asks the user to record perceptions about how others will respond.

The user is asked to contact each subordinate or peer personally and ask for their support by having them complete Form OTHER. The user explains that their data will be kept anonymous by being compiled into a confidential summary report with several other respondents.

The user helps each one to understand that their feedback is important, and encourages frank, candid responses to the questions. The user emphasizes that action on their part is important so that data can be processed in time to provide the summary report. They are asked to complete the questionnaire and mail it in the envelope (not shown) provided within three working days.

The user and the other people are all encouraged to take time to carefully complete the questionnaires, noting that responses will appear on the summary report with those of other people and that the user will benefit by knowing how other people respond and how closely the user's predictions parallel those of others.

All are advised that the summary report will be compiled by persons outside the company and reviewed only by the user to assist in the user improved performance.

All are advised that cooperation in providing the data is appreciated, that the feedback will be more valuable if all items are completed, and that in items dealing with the customer, the user is asked to focus on the internal customers (within the organization), and/or external customers if applicable.

Each item on the user questionnaire is preceded by the question "How satisfied are others with the way you . . . " The response choices are: VS for Very Satisfied, S for Satisfied, N for Neither Satisfied nor Dissatisfied, D for Dissatisfied, and VD for Very Dissatisfied. The questionnaire are completed by circling a choice at the right of each item. For example, if the response choice is "Satisfied" for an item, S is circled at the right of the item.

Although some items may appear to be similar, no two items are exactly the same, and everyone is asked to treat each item separately.

In addition, the other people are asked to record written comments, to take a moment to help the user better understand those particular activities which make her/him an excellent manager and that this is also an opportunity to provide feedback on items or issues not directly addressed in the questionnaire. Assurance is given that this is an important part of the feedback, and the time spent is appreciated. Also, that the comments will be transmitted to the user in an anonymous form, so to assure anonymity, comments or references which would specifically identify the source should be avoided.

Using these two survey instruments for gathering a set of performance appraisal data that is indicative of the performance of a person, provides information upon which to appraise the performance of such person, by means of the system of this invention. The system enables self-review and training by a user in private, without the negative influences of co-worker review as found in the prior known systems. Furthermore, the system 10 employs contemporary teaching techniques and equipment to create and reinforce a positive learning attitude.

In order to accomplish the desired results, the system 10 employs in its compiled data and video vignettes, a suitable set of rationales. The set of rationales used in the illustrated questions in the survey instruments, is based upon the concept of five key commitments of a manager. The five key commitments are the commitment to customer, to organization, to self, to people, and to task.

The commitment to customer stresses that the excellent manager serves the customer, both internal and external. The manager knows who the customers are, is dedicated to meeting the needs of people who use the company's services or products, encourages and listens to input from people who use the company's services or products, and acts to solve customers' problems in a timely manner.

In addition, this commitment stresses that the excellent manager builds customer importance. The manager consistently treats the users of the company's products or services as a top priority, clearly communicates the importance of the people who use the products or services, does not allow destructive comments about these people, and is more committed to customers' long-term satisfaction than the company's short-term gain. The commitment to the organization and its management stresses that the excellent manager builds the organization. The manager knows and supports the mission of the overall organization, discourages destructive comments about the organization, is honest and positive in describing organizational benefits, and inspires pride in the organization.

In addition, this commitment stresses that the excellent manager supports higher management. The manager describes higher level managers in a positive way, avoids destructive comments about higher level managers, personally supports higher level management decisions, and does not "pass the buck" or blame higher level management.

Furthermore, this commitment stresses that the excellent manager operates by the basic values. The manager understands the basic values of the organization, manages using the basic values of the organization, encourages others to operate using the basic values of the organization, and takes corrective action when basic organizational values are compromised.

The commitment to self as a manager stresses that the excellent manager demonstrates autonomy. The manager stands up for the manager's personal beliefs, takes responsibility and ownership for decisions, takes reasonable risks in trying out new ideas, and is more concerned with achieving excellence than "playing it safe."

In addition, this commitment stresses that the excellent manager builds self as a manager. The manager shows a high degree of personal integrity when dealing with others, presents the manager's own self in a positive manner, demonstrates confidence as a manager, and avoids destructive self-criticism.

Furthermore, this commitment stresses that the excellent manager accepts constructive criticism. The manager is willing to admit to mistakes, encourages and accepts constructive criticism, acts on constructive advice in a timely manner, and does not discourage people from giving constructive criticism. The fourth commitment, the commitment to people, individuals, and the work team, stresses that the excellent manager shows positive concern and recognition. The manager consistently shows respect and concern for people as individuals, gives positive recognition for achievement without discomfort to either party, adequately rewards and reinforces top performance, makes people feel like "winners," and avoids destructive comments about people at work.

In addition, this commitment stresses that the excellent manager gives developmental feed-back. The manager effectively analyzes performance, develops specific plans when performance needs improvement, strives to improve people's performance from acceptable to excellent, and gives development performance feed-back in a timely manner. Furthermore, this commitment stresses that the excellent manager encourages innovative ideas. The manager encourages suggestions for improving productivity, provides opportunities for others to try out new ideas, acts on ideas and suggestions from others in a timely manner, and avoids taking credit for the ideas of others.

The fifth commitment, the commitment to the task and mission, stresses that the excellent manager keeps the right focus. The manager knows and supports the mission of the overall organization, ties individual objectives to larger organizational goals, concentrates on achieving what is most important, and places greater emphasis on accomplishing the mission than following procedures. In addition, this commitment stresses that the excellent manager keeps it simple. The manager keeps the work simple enough to be understood and implemented, breaks work into achievable components, encourages efforts to simplify procedures, and avoids unnecessary complications.

Furthermore, this commitment stresses that the excellent manager is action oriented. The manager communicates a positive sense of urgency about getting the job done, emphasizes the importance of day-to-day progress, encourages taking action to get things done, and concentrates on meeting deadlines.

This commitment also stresses that the excellent manager builds task importance. The manager is committed to excellence in task achievement, makes the task meaningful and relevant, encourages suggestions for improving productivity, and does not down-play the importance of the work.

The survey questions and data compilation are organized to reflect these commitments, and thereby provide a framework against which to appraise performance and measure improvement.

A system of four leadership styles is included in the compiled data and the video vignettes, and complements the foregoing set of rationales. The four styles categorize leadership as: delegating; supporting; participating; guiding-coaching; or directing. Such categories serve to fill out the framework provided by the five commitments and thus provide a means for the user of the system 10 to relate and comprehend factors involved in improving performance.

Considering now the compiled information, the data received from the survey responses are compiled and organized according to the five commitments and the four styles. The compilation of stored information is produced by the computer 200, using known means such as keying all survey responses into the computer 200, which performs the compilation.

E. COMPUTER SOFTWARE

Referring now to FIGS. 13-20, there is shown detailed flowcharts of the computer program shown in FIG. 2. The flow charts of FIGS. 13-20 further define each one of the steps 11-18 of FIG. 2. The software is stored in the personal computer 200 of the videotaping system 100.

Figures 13, 14:
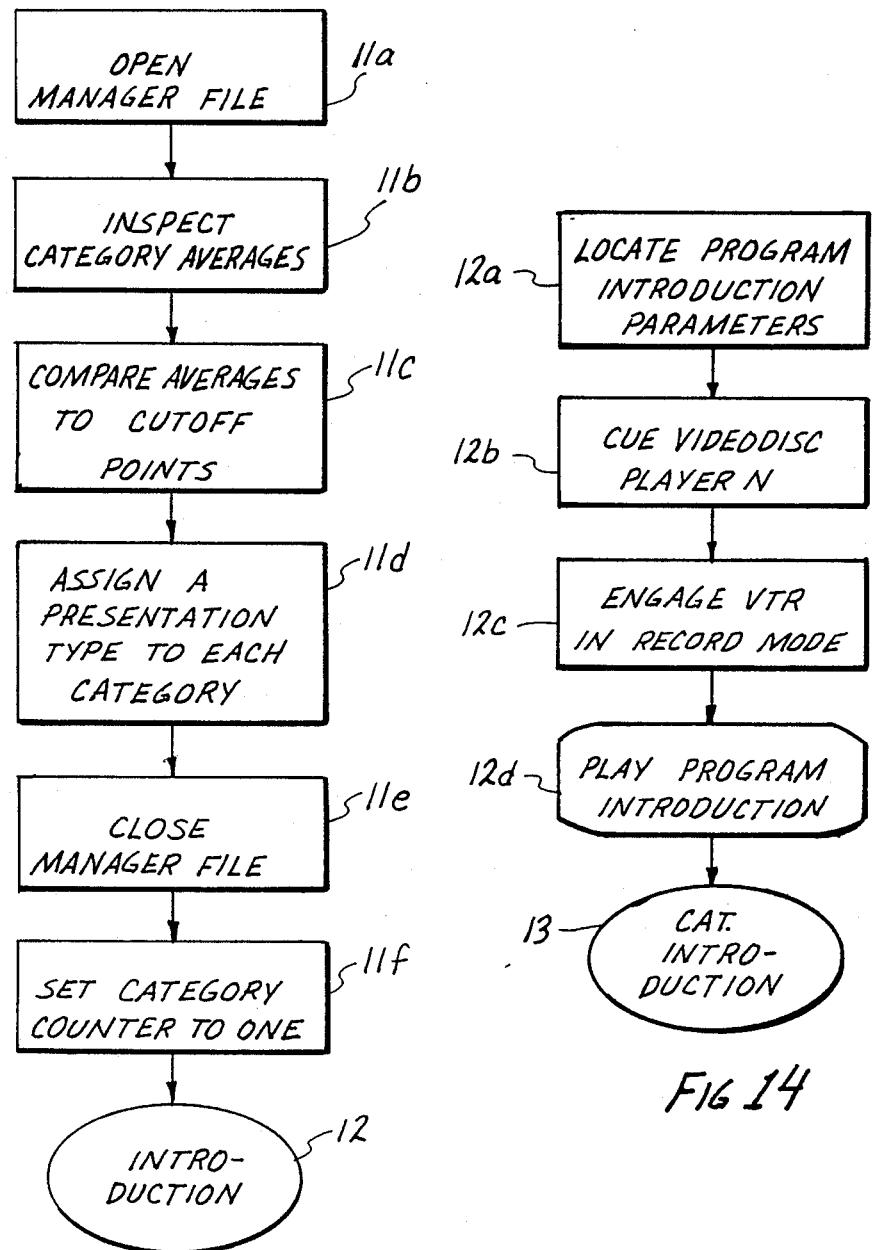

The flow chart of FIG. 13 illustrates in detail the system initialization of FIG. 2, step 11. The system opens the user's data file at 11A, collects the category averages from the report at 11B and 11C, and assigns a presentation type to each category at 11D. The presentation type will later determine what audio and video segments are selected for play back. The system then closes the user's file at 11E. Upon completion of closing the file, the system sets the category counter to 1 at 11F, and proceeds to the introduction 12.

FIG. 14 illustrates the introduction of FIG. 1, step 12. The software locates the parameters for playing back the introduction at 12A. These parameters include videodisc number, starting frame number, ending frame number, and audio track. The software then determines which of the videodisc players contains the required videodisc, and causes that videodisc player to cue to the start of the introduction segment at 12B.

Once the videodisc player is cued, the system (either automatically or by instruction to an operator) engages the videotape recorder to the record mode at 12C. Once the videotape recorder is engaged, the system switches the video switcher to show the video from the appropriate videodisc player and the system begins playing the program introduction at 12D.

Figure 15:
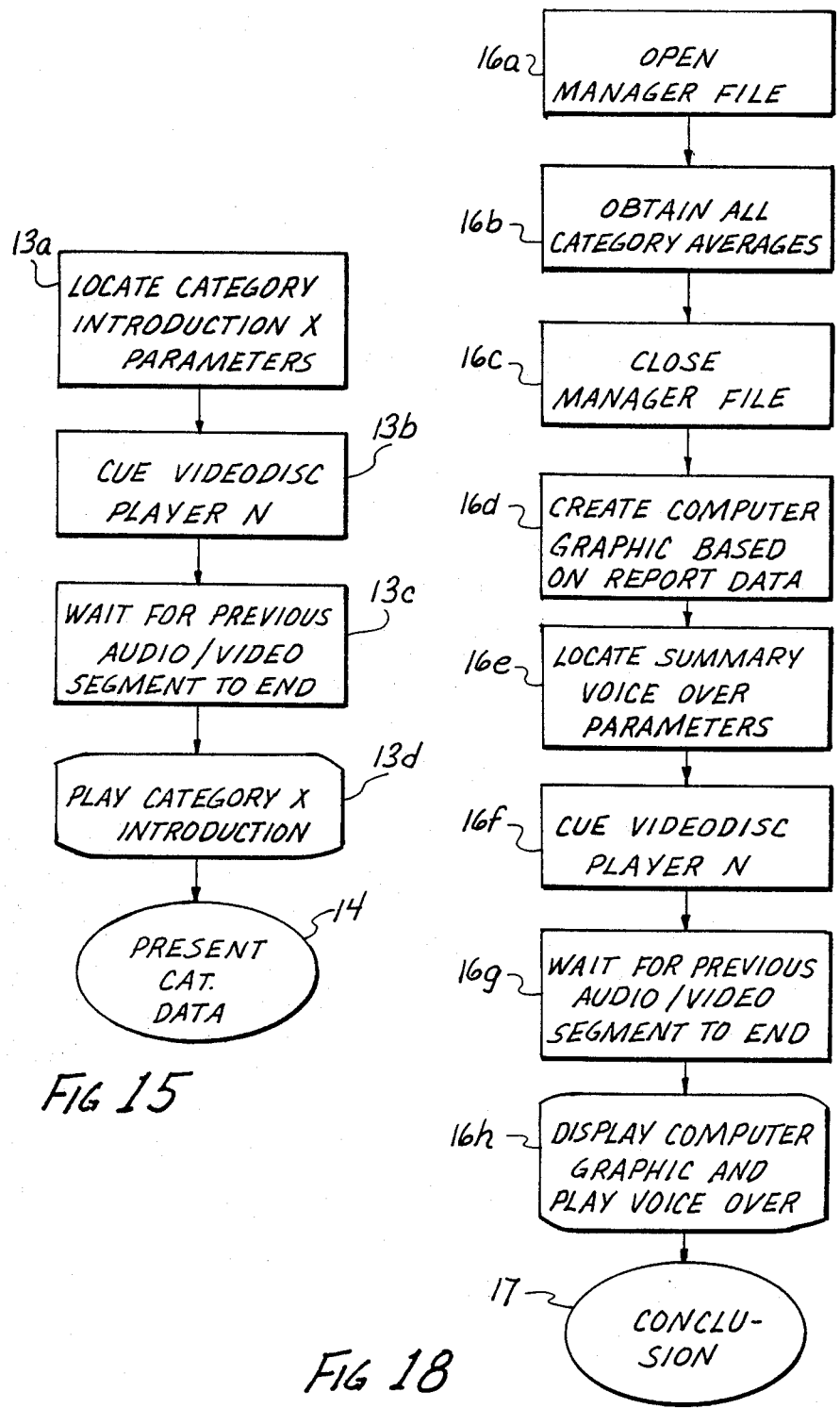

The system then proceeds to the category introduction of FIG. 2, step 13, as illustrated in greater detail in FIG. 15. The system locates the parameters for the current category's introduction at 13A (the disc number, start frame, end of frame, and audio track). The appropriate videodisc player is caused to be cued to the start of the segment at 13B. After waiting at 13C for the conclusion of the audio/video segment currently playing (reach its ending frame), the system switches the video switcher to cause the video segment from the appropriate videodisc player to be played back, and thus the system begins playing the current category's introduction at 13D.

Figure 16:
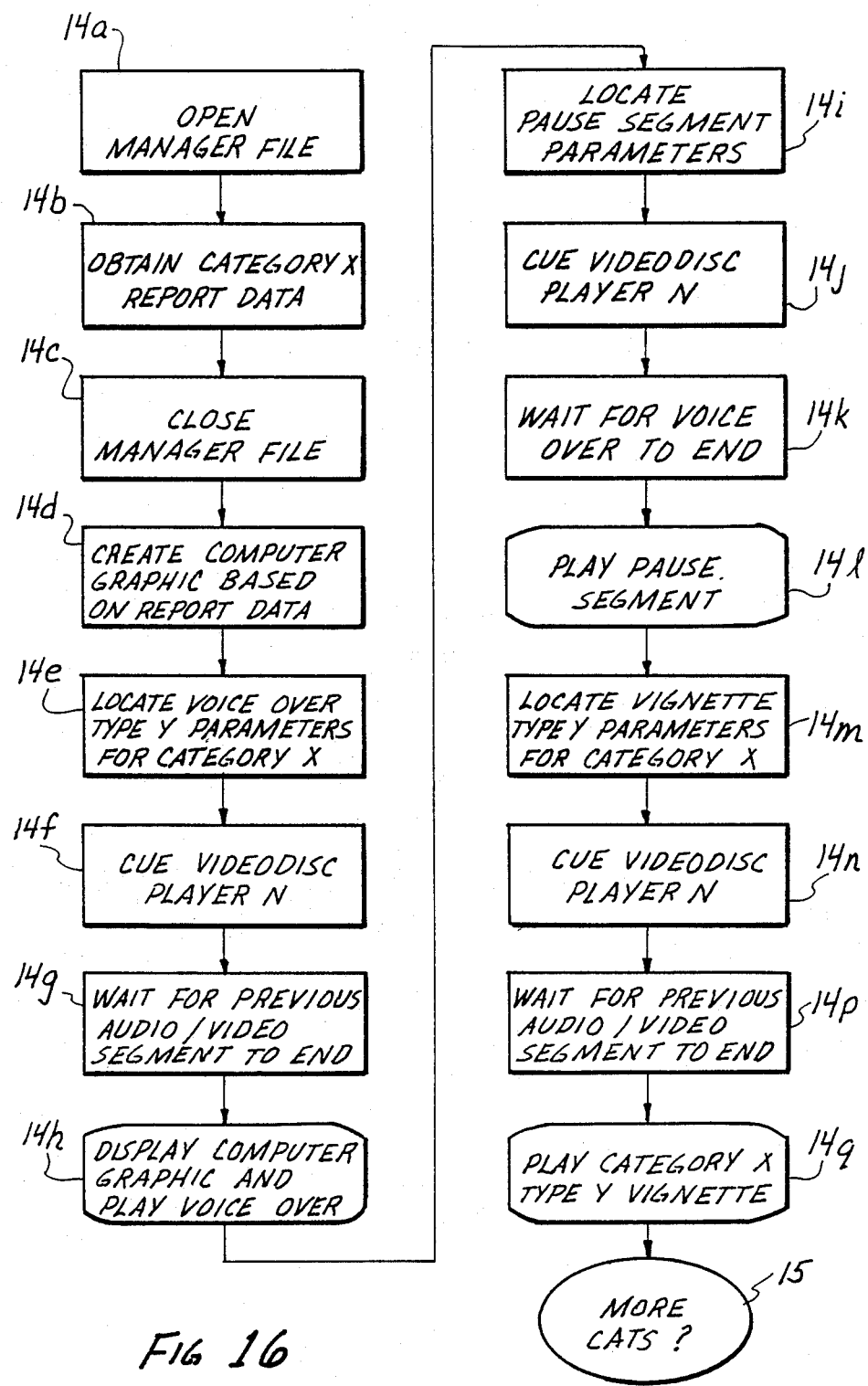

The system then proceeds to the presentation of score data of FIG. 2, step 14, that is illustrated in greater detail in FIG. 16. The system inspects the user's file to obtain the current category's text and numeric data at 14A, B and C. The software creates a computer graphic from the data consisting of numbers, bar charts, and text information at 14D.

The system locates the voice-over parameters (disc number, start frame, end frame, and audio track) for the appropriate presentation type for the current category at 14E.

The appropriate videodisc player is caused to be cued to the start of the segment at 14F. After waiting at 14G for the conclusion of the audio/video segment that is currently playing (reached its ending frame), the system displays the computer graphic just created, and begins playing the appropriate voice over at 14H.

The system then locates parameters (disc number, start frame, end frame, and audio track) at 14I for the pause segment. This segment is included to inform the end user that he or she can now pause the videotape playback to look at a detailed breakdown of the scores presented in the accompanying booklet. The appropriate videodisc player is caused to be cued at 14J to the start of the segment. After waiting at 14K for the conclusion of the audio segment that is currently playing (reached its ending frame), the system switches the video switcher to show the video from the appropriate videodisc player, and the system begins playing the pause segment at 14L.

The system then locates parameters (disc number, start frame, end frame, and audio track) at 14M for the audio/video vignette for the appropriate presentation type for the current category. The audio/video vignette dramatizes the results of the user's scores in the current category. The appropriate videodisc player is caused to be cued at 14N to the start of the segment. After waiting at 14P for the conclusion of the audio/video segment that is currently playing (reach its ending frame), the system switches the video switcher to show the video from the appropriate videodisc player and the system begins playing the audio/video vignette at 14Q.

The system then proceeds to the more categories logic of FIG. 2, step 15 that is illustrated in FIG. 17. This portion of the software determines if there are any more category reports to be given. The category counter is incremented by one at 15A and then tested at 15B. If the category counter is found to be less than or equal to the number of available categories, the system proceeds to the next category report at 13. If the category counter is found to be greater than the number of available categories, the system proceeds to the summary of data at 16.

The summary of data of FIG. 2, step 16, is illustrated in greater detail in FIG. 18. The system inspects the user's file at 16A, B and C to obtain all category averages. The software creates a computer graphic at 16D from the data consisting of numbers, bar charts, and text information. The system locates the voice-over parameters (disc number, start frame, end frame, and audio track) for the data summary at 16E. Then, the appropriate videodisc player is caused to be cued to the start of the segment at 16F.

After waiting at 16G for the conclusion of the audio/video segment that is currently playing (reached its ending frame), the system displays the computer graphic just created, and begins playing the appropriate voice over at 16H.

The system then proceeds to the conclusion of FIG. 2, step 17, which is illustrated in greater detail in FIG. 19. The software locates the parameters (videodisc number, starting frame number, ending frame number, and audio track) at 17A for playing back the conclusion.

The software then determines which of the videodisc players contains the required videodisc, and causes that videodisc player to cue at 17B to the start of the introduction segment.

After waiting at 17C for the conclusion of the segment that is currently playing (reached its ending frame), the system switches the video switcher to show the video from the appropriate videodisc player and the system begins playing the conclusion segment at 17D.

The system waits at 17E for the conclusion segment to end, and then stops the videotape machine (either automatically or by operator intervention) at 17F.

The system then proceeds to creating the videotape label of FIG. 2, step 18, as illustrated in greater detail in FIG. 20. The software then causes the printer to print a label (not shown), as indicated at 18A, for the videotape cassette on adhesive paper, so that the operator can affix it to the videotape cassette. The operation ends at 18B. This concludes the creation of one personalized videotape.

As various changes may be made in the form, construction, and arrangement of the procedures and parts described herein, without departing from the spirit and scope of the invention and without sacrificing any of its advantages, all matter herein is to be interpreted as illustrative and not in any form limiting sense. For example, while a video cassette is preferred for the recording media, other forms may also be employed. Such recording media may well include laser discs and sound film recordings.

Also, while a performance appraisal and training system is disclosed, it will become apparent to those skilled in the art, that the system may be used for other types and kinds of personalized feedback systems. For example, the system and apparatus of the present invention may be used to sell travel programs, financial planning services, or the like.

Additionally, while a video system is disclosed, it will become apparent to those skilled in the art that other forms of motion picture systems, such as film, may be employed. Also, instead of a motion picture system, the feedback system of the present invention may be an audio system for producing an audio recording.

Thus, the only limitation imposed on the invention, should be within the scope of the appended claims

What is claimed is:

1. A personalized feedback system, comprising:
    survey means for storing groups of personalized input data indicative of the personal information of a user;
    compilation means for providing computer-readable personalized input data signals indicative of a compilation of the stored groups of said data for the user;
    feedback presentation memory means for storing a group of pre-recorded feedback display signals indicative of a group of vignettes illustrative of various results likely to accompany a variety of personal information, corresponding to a variety of possible compilations; and
    recording means for storing said data signals indicative of the compilation of data and feedback display signals, resulting from the personalized data of the user; and
    switching means responsive to said data signals for causing said recording means to store data signals for a certain user, and to store selected ones of the feedback display signals corresponding to the stored data signals in a certain sequence.

2. A system as recited in claim 1, wherein the feedback presentation memory means includes:
    a videodisc recording, and said vignettes are motion picture vignettes.

3. A system as recited in claim 2, further comprising:
    switching means responsive to the computer means for switching selected ones of the display signals from the videodisc player means to the videotape recording means.

4. A system as recited in claim 1, wherein said recording means includes:
    videodisc player means for playing back selected ones of the pre-recorded feedback display signals; and
    video tape recording means for rerecording selected one of the display signals on a selected recording medium.

5. A system as recited in claim 1, further comprising:
    computer means for coordinating the selection and rerecording of selected ones of the feedback display signals according to the personalized input data signals.

6. A system as recited in claim 1, further comprising:
    graphics overlay means for generating a series of graphic signals for inclusion in a video taped feedback presentation being produced.

7. A system as recited in claim 1, further comprising:
    encoding means for encoding graphic signals with selected feedback display signals to form a composite video signal for video taping.

8. A system as recited in claim 1, further comprising:
    synchronizing means for generating a timing signal for use in synchronizing video taping.

9. A system as recited in claim 1, further comprising:
    monitor means for monitoring videotaping.

10. A system as recited in claim 1, wherein said recording means includes:
    player means for playing back selected ones of a series of pre-recorded signals;
    recording means for re-recording the selected signals on a selected recording medium;
    computer means for coordinating the selection and re-recording of the selected pre-recorded signals according to a compilation of data signals supplied to the computer;
    switching means responsive to the computer means for switching selected one of the display signals from the player means to the recording means;
    graphics overlay means for generating a series of graphic signals for inclusion in a feedback presentation being produced;
    encoding means for encoding signals with selected display signals to form a composite signal for recording purposes; and
    synchronizing means for generating a timing signal for use in synchronizing purposes.

11. A recording system comprising:
    data base means for storing a series of individual input data groups;
    information means for storing a plurality of groups of pre-recorded signals;
    a plurality of memory storage media units;
    means for accessing repeatedly said data base means to retrieve selected ones of said series of data groups;

means for analyzing retrieved selected ones of said series of data groups according to a predetermined plan;

means responsive to the last mentioned means for accessing selectively certain one of said groups of pre-recorded signals from said information means in a predetermined order; and means responsive to the last-mentioned accessing means for re-recording onto a single selected one of said memory storage media units a plurality of accessed selected groups of pre-recorded signals in said predetermined order.

12. A recording system as recited in claim 11, wherein:

said information means includes player means for playing back the selected ones of said pre-recorded signals;

said re-recording means includes computer means for coordinating the selection and re-recording of said selected ones of said pre-recorded signals according to a compilation of selected ones of said series of data groups supplied to the computer means;

switching means responsive to said computer means for switching selected ones of the signals from the player means to the re-recording means;

overlay means for generating a series of overlay signals for re-recording on a feedback presentation being produced;

encoding means for encoding the selected groups of pre-recorded signals with selected overlay signals to form composite signals for re-recording purposes; and synchronizing means for generating a timing signal for use in synchronizing the re-recording of said composite signals.

13. A system as recited in claim 12, wherein said player means includes a videodisc player means, said recording means includes a videotape recording means, and said pre-recorded video signals include a group of motion picture vignettes.

14. A system as recited in claim 12, further comprising:

monitor means for monitoring videotaping.

15. A system as recited in claim 12, wherein:

the videotape recording means includes means for recording on a conventional video cassette.

16. A recording system according to claim 12 wherein said overlay means includes means defining graphics and said overlay signals are indicative of graphic data.

17. A recording system according to claim 11 wherein said pre-recorded signals are video signals.

18. A method of making a personalized feedback system pre-recorded recording media corresponding to a variety of possible compilations of personal data procured for an individual user, comprising:

using a plurality of recording media;

storing a plurality of groups of pre-recorded video signals indicative of a group of motion picture vignettes illustrative of various different groups of personal data for a variety of individual users;

storing a series of individual input data groups said data being indicative of personal, performance data for a certain user;

accessing repeatedly selected ones of a series of the individual input data groups;

analyzing selected ones of said series of data groups according to a predetermined plan;

accessing selectively certain ones of said stored groups of pre-recorded video signals in a predetermined order; and re-recording onto a single selected one of said recording media a plurality of accessed selected groups of pre-recorded video signals corresponding to the stored personal performance data in said predetermined order.

19. A method as recited in claim 18, wherein the recording media is motion picture recording media, and the personal data is performance data, further including:

procuring performance data indicative of the performance of an individual.

20. A method as recited in claim 19, further comprising the steps of:

using a personal computer to coordinate storage in a predetermined sequence according to the performance data procured.

21. A method as recited in claim 18, wherein:

the steps of storing a plurality of groups of pre-recorded video signals includes storing said signals on a conventional video cassette 22. A method of making a personalized feedback system, comprising the steps of:

storing groups of personalized input data indicative of the personal information of a user;

providing computer-readable personalized input data signals indicative of a compilation of the stored groups of said data for the user;

storing a group of pre-recorded feedback display signals indicative of a group of vignettes illustrative of various results likely to accompany a variety of personal information, corresponding to a variety of possible compilations;

storing said data signals indicative of the compilation of data and feedback display signals, resulting from the personalized data of the user; and causing said recording means to store data signals for a certain user, and to store selected ones of the feedback display signals corresponding to the stored data signals in a certain sequence.

23. A method of making a recording on a memory storage media unit comprising:

storing a series of individual input data groups;

storing a plurality of groups of pre-recorded signals;

using a plurality of memory storage media unit;

retrieving repeatedly selected ones of said series of individual input data groups;

analyzing retrieved selected ones of said series of data groups according to a predetermined plan;

accessing selectively certain ones of said groups of pre-recorded signals in a predetermined order; and re-recording onto a single selected one of said memory storage media units a plurality of accessed selected groups of pre-recorded signals in said predetermined order.

24. A personalized feedback systems pre-recorded recording media made by the method of claim 23.

25. A method of making a recording on a memory storage media unit according to claim 23, further comprising the steps of:

storing a series of substantially different pre-recorded signals;

playing back selected ones of said series of pre-recorded signals;

re-recording said selected signals on a selected recording medium;

coordinating the selection, compilation and re-recording of said selected ones of said pre-recorded signals according to a predetermined personalized compilation of data signals;

generating computer output signals responsive to said predetermined personalized compilation of data signals;

switching said selected ones of said pre-recorded signals from a plurality of selected players, to a recording means, in response to said computer output signals;

generating a series of graphic signals for inclusion in a feedback presentation being produced;

encoding signals with selected display signals to form a composite signal for recording purposes; and generating a timely signal for use in synchronizing purposes.

26. A personalized feedback system pre-recorded recording media made by the method of claim 25.

* * * * *

UNITED STATES PATENT AND TRADEMARK OFFICE
CERTIFICATE OF CORRECTION

PATENT NO. : 4,863,384

DATED : September 5, 1989

INVENTOR(S) : Michael G. Slade

It is certified that error appears in the above-identified patent and that said Letters Patent is hereby corrected as shown below:

Column 7, line 28, after "surveys", insert --.--.

Column 7, line 36, after "nineteen", delete "7".

Column 7, line 44, after "review", insert --.--.

Column 9, line 60, after "response", insert --.--.

Signed and Sealed this

Thirtieth Day of April, 1991

*Attest:*

HARRY F. MANBECK. JR.

*Attesting Officer*    *Commissioner of Patents and Trademarks*